Figure 1:
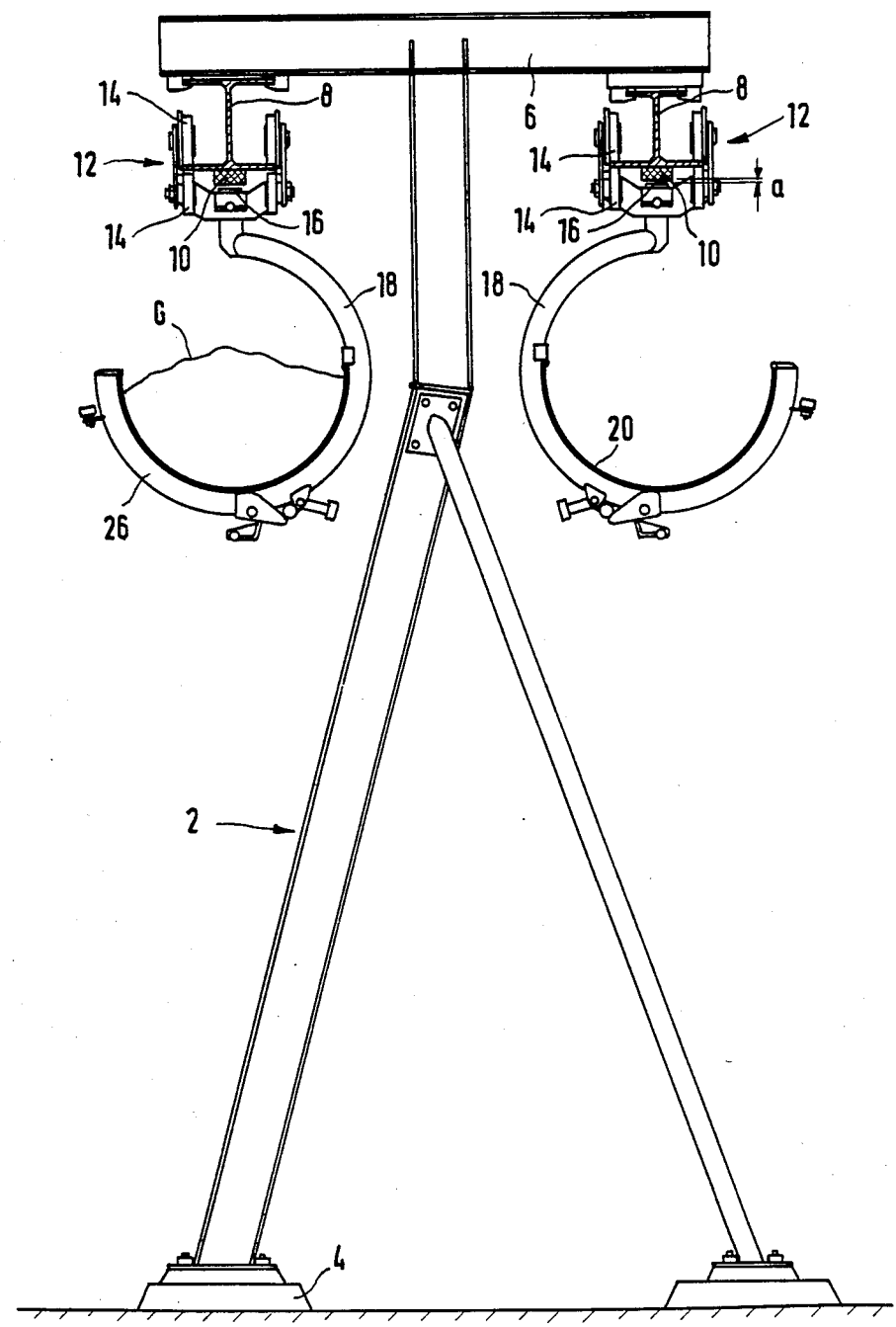

United States Patent [19]

Heidelberg

[11] Patent Number: 4,792,036
[45] Date of Patent: Dec. 20, 1988

[54] TRANSPORTING DEVICE OF THE CONVEYOR BELT TYPE

[76] Inventor: Götz Heidelberg, Am Hügel 16, D-8136 Percha, Fed. Rep. of Germany

[21] Appl. No.: 68,817

[22] Filed: Jun. 26, 1987

Related U.S. Application Data

[63] Continuation of Ser. No. 662,269, Oct. 18, 1984, abandoned.

[30] Foreign Application Priority Data

Oct. 20, 1983 [DE] Fed. Rep. of Germany ....... 3338199

[51] Int. Cl.$^4$ ............................................. B65G 35/00
[52] U.S. Cl. .................................... 198/619; 198/805; 198/365; 198/678; 198/818; 105/268
[58] Field of Search ............ 198/619, 805, 365, 483.1, 198/485.1, 678, 682, 703, 704, 706, 715, 818, 819, 820, 821, 822; 104/290, 292, 293, 294, 89, 95; 105/148, 268

[56] References Cited

U.S. PATENT DOCUMENTS

| | | | |
|---|---|---|---|
| 2,974,608 | 3/1961 | Grube | 104/95 |
| 3,616,762 | 11/1971 | Benner | 104/293 |
| 4,284,010 | 8/1981 | Marshall | 104/293 X |

FOREIGN PATENT DOCUMENTS

| | | | |
|---|---|---|---|
| 710220 | 12/1956 | Fed. Rep. of Germany | 198/819 |
| 736256 | 12/1956 | Fed. Rep. of Germany | 198/678 |
| 1030249 | 5/1958 | Fed. Rep. of Germany | 198/678 |
| 1183011 | 12/1964 | Fed. Rep. of Germany | 198/819 |
| 1218954 | 6/1966 | Fed. Rep. of Germany | . |
| 1931901 | 1/1971 | Fed. Rep. of Germany | . |
| 2135970 | 2/1973 | Fed. Rep. of Germany | 198/619 |
| 2339060 | 8/1973 | Fed. Rep. of Germany | . |
| 2207930 | 8/1973 | Fed. Rep. of Germany | 104/290 |
| 2933450 | 2/1981 | Fed. Rep. of Germany | . |
| 3214811 | 8/1983 | Fed. Rep. of Germany | . |
| 122072 | 1/1959 | U.S.S.R. | 198/678 |
| 1047790 | 10/1983 | U.S.S.R. | 104/293 |
| 1253768 | 11/1971 | United Kingdom | . |
| 1513561 | 6/1978 | United Kingdom | 104/290 |

OTHER PUBLICATIONS

H. Weh, "Elektrische Linearantriebe fur die Transportechnik", periodical Elektrotecknik und Maschinanleau, 1981, pp. 458–465, published Nov. 1981.

H. Autruffe, "Le moteur lineaire," periodical Revue generale de chemen de fer 90, pp. 438–450, pub. 1971.

*Primary Examiner*—L. J. Paperner
*Assistant Examiner*—D. Glenn Dayoan
*Attorney, Agent, or Firm*—Hubbard, Thurman, Turner & Tucker

[57] ABSTRACT

A transporting device of the conveyor belt type, in which a transporting belt, on which the material to be transported can be supported, is capable of being moved along a transport path by a driving mechanism and carried using rolling bodies. The transport path is equipped with an electrical travelling-wave stator (10). Permanent magnets (16) are provided arranged in series, which communicate with the transporting belt (20) in a power-transmitting fashion and form a linear motor with the travelling-wave stator (10) with an air-gap between the pole faces of the attracting permanent magnets (16) and the travelling-wave stator (10). The permanent magnets (16) and the travelling-wave stator (10) are held at air-gap space (a) by rolling bodies (14).

8 Claims, 6 Drawing Sheets

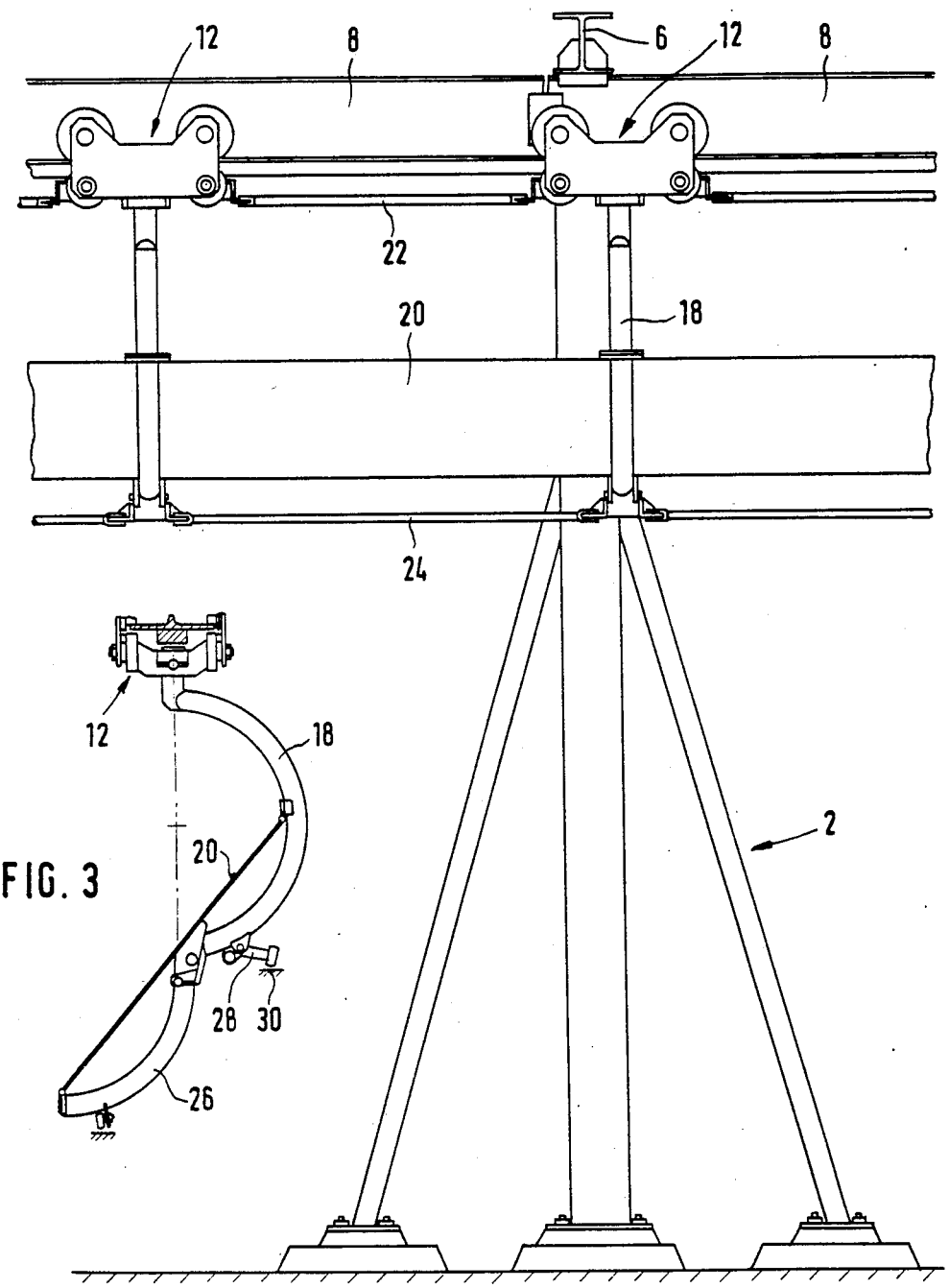

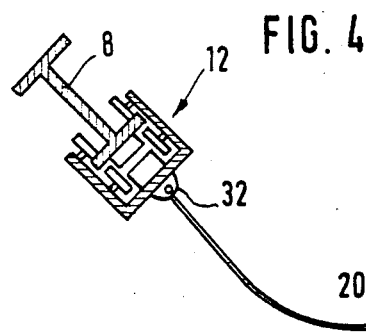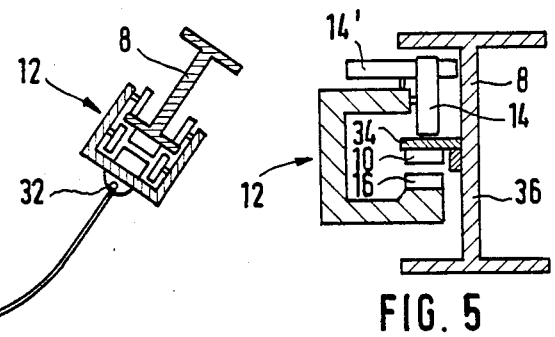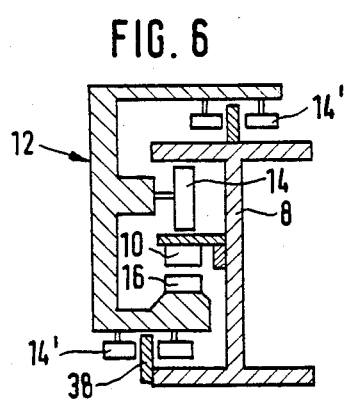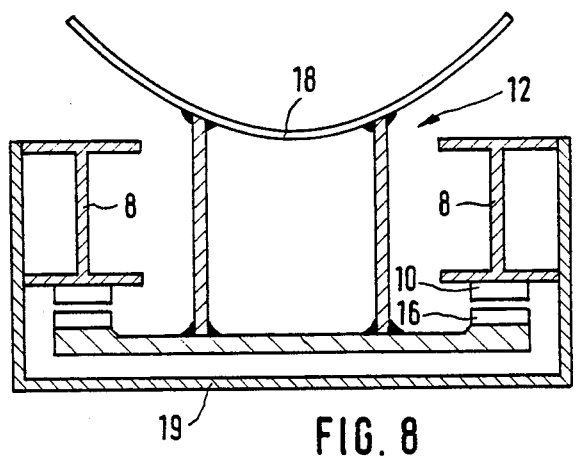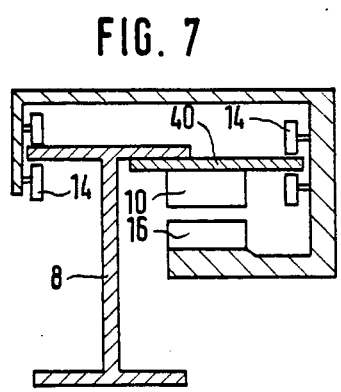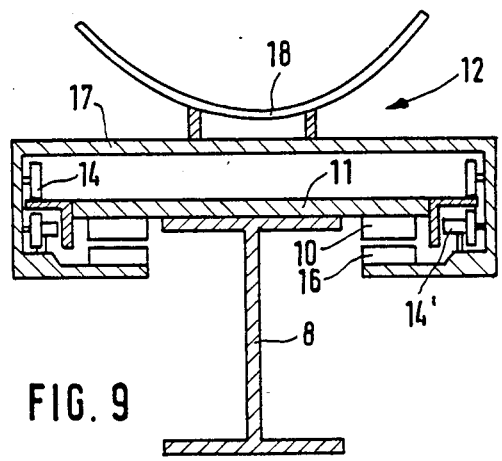

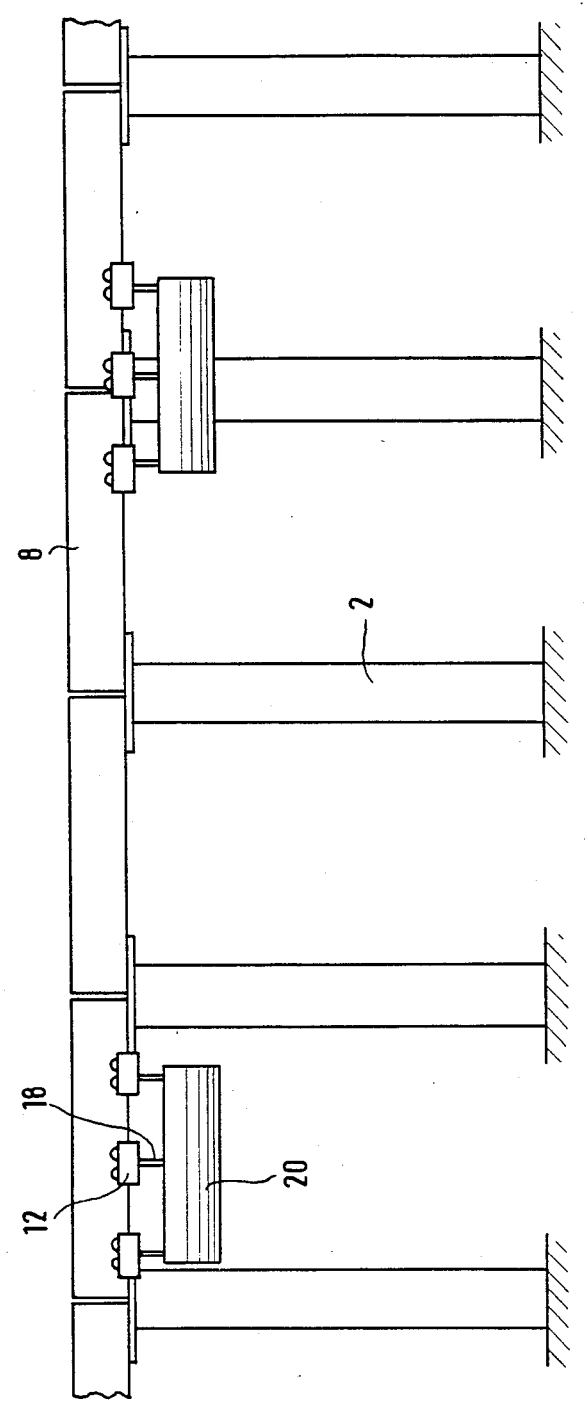

TRANSPORTING DEVICE OF THE CONVEYOR BELT TYPE

This application is a continuation of application Ser. No. 662,269, filed Oct. 18, 1984, abandoned.

The present invention relates to a transporting device of the conveyor belt type.

Conventional conveyor belt transporting devices essentially comprise a transporting belt, frequently made of rubber, a series of mutually spaced rollers for carrying the transporting belt, and a drive means, frequently an electromotor, which acts on the transporting belt, yielding its driving torque to the transporting belt at a deflection roller.

It is felt to be a disadvantage of such conventional conveyor belt transporting devices that the transporting belt must transmit in itself the motive forces, which are considerable, in particular when it is relatively long, and that the required power, which is often very high, is introduced into the transporting belt concentrated on one point, which generally necessitates very large driving motors, large transmissions, etc.

The invention is based on the problem of providing a conveyor belt transporting device with a simple construction, decentralized introduction of the required power and at least partial relief of the transporting belt of longitudinal driving forces.

In the inventive transporting device, the transporting belt is driven by an electrical linear motor with an adapted design, which introduces the required power into the transporting belt distributed along a stretch in the longitudinal direction of the transport path. Due to the conception of the linear motor provided in the inventive conveyor belt transporting device, the rolling bodies are relieved at least in part, preferably to a large extent or even virtually completely or completely, from taking up carrying forces arising in the weight of the transporting belt or the material being transported; they instead serve primarily to maintain the air-gap space of the linear motor. The weight of the transporting belt and the material to be transported is carried at least in part, preferably predominantly or even virtually completely or completely, by the permanent magnets cooperating attractingly with the travelling-wave stator. The travelling-wave stator and the seriate permanent magnets constitute a device which provides in combination both carrying forces and propulsive forces. The transporting belt may be located below the arrangement comprising the travelling-wave stator and the permanent magnets, or else above this arrangement, examples of this being provided below. The air-gap space of the linear motor need not be constant, but may vary along the transporting device and/or in accordance with the loaded state of the transporting belt, examples of this being provided below.

In the inventive transporting device, the rolling bodies constitute a functional part of the linear motor, are preferably not provided as direct physical support of the transporting belt and, as is particularly important, preferably move together with the transporting belt along the transport path. In this manner the transporting belt is not deformed by running over rolling bodies during its movement in the longitudinal direction of the transport path, as is the case in conventional conveyor belt devices. Instead, the cross-sectional form of the transporting belt is essentially maintained, thereby avoiding deformation work in the transporting belt and resulting inner friction in the material being transported. This leads to lower consumption of energy. Furthermore, the cross-sectional form of the transporting belt may be selected without consideration of direct support by rolling bodies, preferably so as to have a marked trough shape in order to increase the transporting capacity, which also reduces the effect of wind, etc., on the material being transported.

It is favorable and preferred in many cases of application not to equip the transporting belt evenly with permanent magnets, but to provide the permanent magnets on trolley-like moving elements mutually spaced in the longitudinal direction of the transport path, which carry the transporting belt at spaced points. In this manner the number of permanent magnets can be reduced, but the fundamental advantages of the invention as described above retained. Several or all of these moving elements are preferably connected with each other by longitudinal bonds in the longitudinal direction of the transport path, in order to keep the transporting belt free of longitudinal propulsive forces and guarantee synchronous running of the moving elements without participation of the transporting belt, except for the electrical synchronization of the linear motor.

It is preferable in particular when the moving elements are spaced somewhat further apart, to arrange longitudinal bonds to tighten the transporting belt, instead of the above-mentioned longitudinal bonds or in addition to them, in the vicinity of the transporting belt between several or all moving elements. In this manner an undesirably large sag in the transporting belt is avoided.

A construction of the transoorting device which is particularly favorable as far as costs are concerned, and is therefore preferred, results when the transport path exhibits longitudinal structural girders and spaced supports for the structural girders, the travelling-wave stator being attached to the structural girders and the structural girders providing a running surface for the rolling bodies. The structural girders, which may be self-supporting over a length of several meters, thus fulfil a double function. The elevated cnnstruction is inexpensive and requires only a small area on the ground.

The return of the transporting belt, which is generally required, is preferably performed in such a way that the transport path exhibits two tracks of movement of each direction of the transporting belt, one arranged above or beside the other. Each track of movement is equipped with a linear motor. However, the transporting belt may also be returned in another way, for example using a triangular course.

The geometrical assignment of the linear motor to the transported belt may be performed constructionally in many ways. It is particularly favorable and preferred for some cases of application to equip each longitudinal edge of the transporting belt with a separate linear motor with air-gap spacing by means of rolling bodies. In this way the carrying forces are exerted particularly favorably at precisely those points where they can be directly introduced into the transporting belt. In particular when the transporting belt has an upwardly concave trough-shaped cross-section in a loaded state, the linear motors may be provided with a direction of the carrying force such that this direction coincides completely or almost completely with the orientation of the transporting belt at its edge. Configurations may arise in the process in which the directions of the carrying force of the two linear motors point upward/outward on a slant from the center of the transporting belt.

It is a characteristic point of the linear motor with air-gap spacing by means of rolling bodies, as provided in the inventive transporting device, that a very definite carrying force provided by the permanent magnets results when there is a certain distance between the running surface of the rolling bodies on the transport path and the travelling-wave stator. When the carrying force is coordinated, by selection of the stated distance, with the loaded state of the transporting belt in such a way that th required carrying force is provided completely, if possible, by the permanent magnets, a magnetic carrying force which is too great, so to speak, results when the transporting belt is returned in an unloaded state, and must be absorbed by the rolling bodies or in another way. In order to reduce rolling resistance and attrition of the rolling bodies in this respect, a different air-gap space is provided in a development of the invention for the loaded forward movement and the unloaded return of the transporting belt due to a different distance between the running surface of the rolling bodies on the transport path and the travelling-wave stator. It is favorable when such a large air-gap space is provided for the return of the transporting belt that the permanent magnets provide as precisely as possible the carrying force required to carry the unloaded transporting belt.

A more perfect adaptation of the air-gap space to the carrying force required in a particular case, even responding to different loaded states of the transporting belt, is preferably attained by having the distance between the transporting belt and the linear motor be resiliently variable in accordance with the loaded state of the transporting belt, and providing transmitting elements for converting this change of distance into a displacement of the rolling bodies relative to the permanent magnets, and thus into a change of the air-gap space. These transmitting elements preferably work in a power-transmitting fashion, for example, mechanically, hydraulically or pneumatically.

Preferably, carrying elements for the transporting belt spaced in a longitudinal direction and moved along with the transporting belt are provided, which may be pivoted altogether or in part to unload the transporting belt. In this manner the transporting belt can be unloaded in an unloading area in a particularly favorable fashion without any constructional effort being expended on the linear motor itself. A particularly simple, mechanical solution for partial or complete pivoting of the carrying elements in an unloading area of the transport path consists in providing a suitable contacting face there which mechanically forces the desired pivoting movement to take place.

A particularly preferred, specific possibility for unloading the transporting belt consists in having the carrying elements exhibit an upwardly concave area in an unpivoted state and part of the area being downwardly pivotable in order to provide the transporting belt for unloading with a downwardly sloping position with respect to one longitudinal edge. The unloading possibilities described are realized particularly simply when the transporting belt is put into an unloading position locally only in the particular unloading area, while running in its normal position before and after this area. The transporting belt is designed for this purpose in such a way that it can perform the transition from the normal transporting position to the unloading position and vice versa. This can be done in the most simple way in the case of flexible transporting belts, for instance made of rubber.

A catch is preferably provided between the area of the particular carrying element to be downwardly pivoted for unloading and the rest of the carrying element, and a contacting faee for opening the catch in the particular unloading area of the transport path. To close the particular catch after the unloading area, a corresponding contacting face, a locking spring between the area of the particular carrying element to be pivoted and the rest of the carrying element, etc., may be provided.

In the inventive transporting device, the transporting belt need not necessarily be uninterrupted along the entire forward and return sections of the transport path. The transporting belt may also be divided up into several single sections in the longitudinal direction of movement. The various sections of the transporting belt may then be connected with each other, if desired, by longitudinal bonds.

In a particularly preferred embodiment of the invention, the permanent magnets form a synchronous linear motor or synchronous linear motor sections with the travelling-wave stator, and the movement of the transporting belt or the transporting belt sections is controlled according to the automatic control principle, by which the linear mooor armature itself controls the synchronous electric stress on the linear motor stator. For this automatic control, the travelling-wave stator is divided up into several stator sections. Each stator section has a switching device assigned to it, by means of which the current conductors of this stator section may be connected with an energy supply unit. This means that not all current conductors of the travelling-wave stator constituting the transport path need to be supplied with energy at the same time, which would, on the one hand, lead to relatively high power losses and, on the other, necessitate components which would have to be designed for very high performance. The various stator sections are switched on and off by aid of sensor devices which are arranged along the transport path and can be influenced by the linear motor armature. These sensor devices allow for information to be transmitted concerning at least the particular relative positions of the linear motor armature and the linear motor stator. These measures succeed in making the linear motor armature itself control the switching-on and switching-off of the various stator sections. The automatic control has a particularly favorable effect in particular when the various stator sections are shorter than the transporting belt or the transporting belt sections.

In a particularly preferred embodiment of the invention, each stator section has its own energy supply unit assigned to it, which can be connected to the particular stator section by means of the assigned switching device and, when connected to the assigned stator section, effects a thrust in the latter, which leads to an acceleration, braking or steady travel, depending on the local conditions and in accordance with a travelling speed profile which is predetermined for the entire transporting system.

The power control unit of each motor element preferably has a memory assigned to it, in which a number of different travelling speed control signals corresponding to the number of predetermined triggerable travelling programs may be stored, these signals controlling each energy supply unit to provide power to the assigned stator section, which leads to a locally specified speed of the linear motor armature corresponding to the selected travelling program and which is in the range of travelling speed zero to a locally specified maximum speed individually predetermined for the particular stator section. Each of the memories of the various energy supply units may be connected to a common bus line via which the particular travelling program number desired is given to the various memories, which then causes each energy supply unit to provide power to the assigned stator section, leading to the travelling behavior predetermined for this travelling program number for the stator section under consideration.

The invention also relates to a method for operating an inventive transporting device, which is characterized by the fact that the transporting belt sections are driven at different speeds in different areas of the transport path, preferably slower in loading or unloading areas or at sharp curves in the transport path than in relatively long, straight or slightly curved areas of the transport path. This method can be realized in particular with linear motors according to the automatic control principle, and offers the novel possibility of providing different speeds of the transporting belt sections in different areas of the transport path in spite of the use of synchronous linear motors.

The term "transporting belt" used in the present application does not mean that a transporting belt is necessarily involved which is uninterrupted as a whole or in the corresponding transporting belt section, although this is the preferred case. The transporting belt or the transporting belt sections may, for example, be composed of units connected to each other to form sections, or of coupled sub-units, and/or a modified means for receiving the material to be transported may be provided instead of a transporting belt.

A particularly preferred embodiment of the invention consists in providing transporting belt sections which travel at a greater distance from each other and a relatively high speed of movement on the predominant part of the transport path, in particular in areas of the transport path between the loading and unloading areas, while the transporting belt sections travel at a smaller or negligible distance from each other and a relatively low speed of movement suitable for loading and unloading, in particular in the loading and unloading areas. Thus, only part of the entire length of the path of movement of the transporting belt sections is provided with relatively elaborate technology in the form of transporting belt sections, which allows for a reduction in the necessary investment costs while the transporting efficiency at least remains constant, in comparison with conventional conveyor belt devices.

The invention and developments of the invention shall be described in more detail in the following, with reference to embodiments which are partly shown schematically. The figures show:

FIG. 1 a cross-section of a first embodiment of the transporting device

FIG. 2 a side view of the transporting device as in FIG. 1

Figure 10:
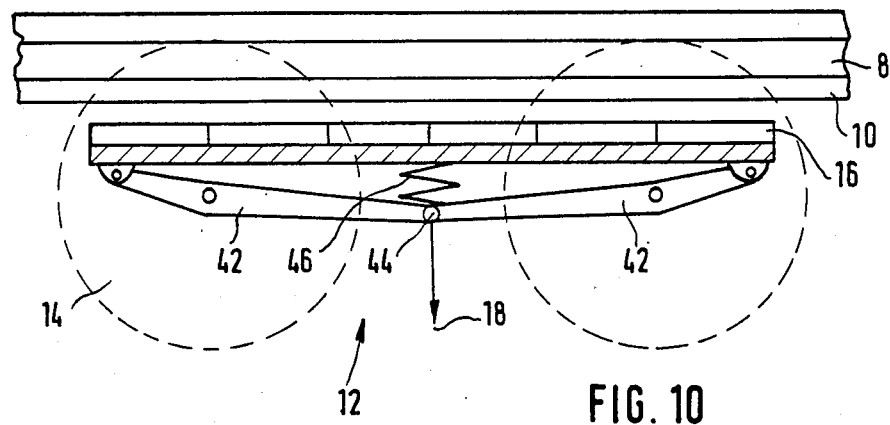
Figure 11:
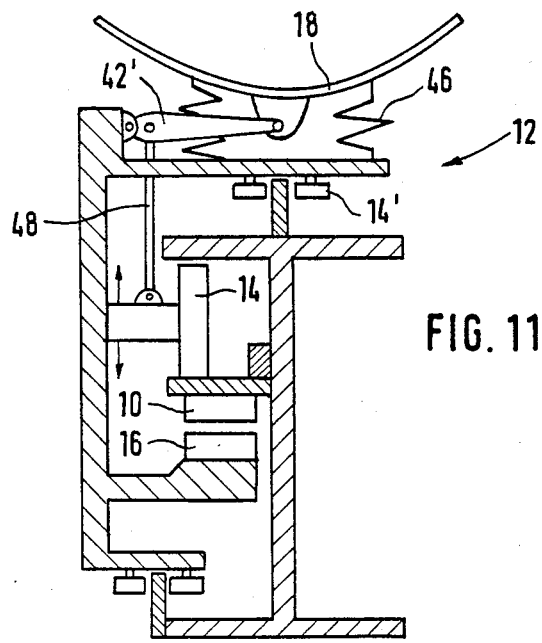
Figure 12:
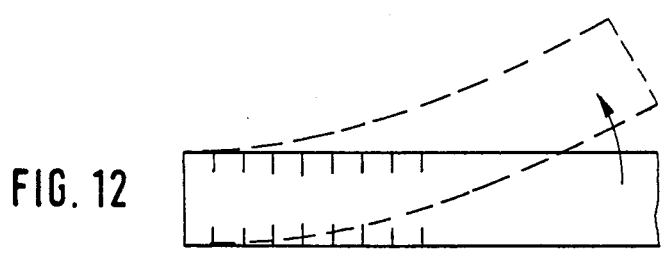
Figure 13:
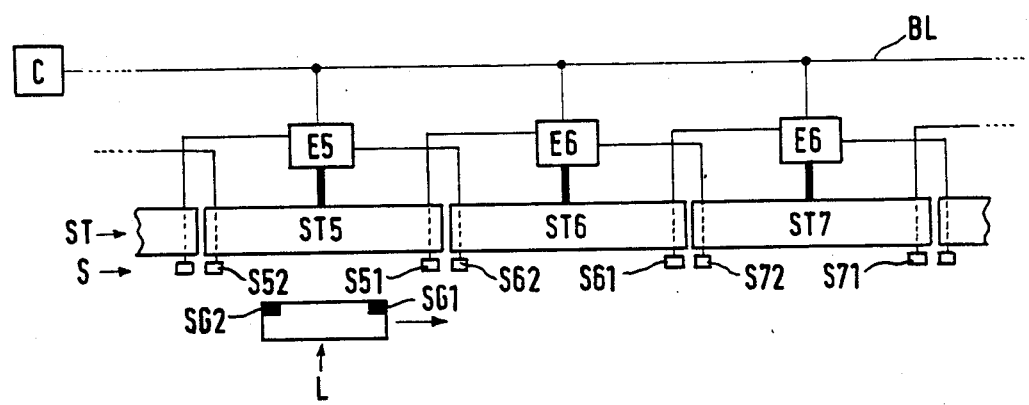
Figure 14:
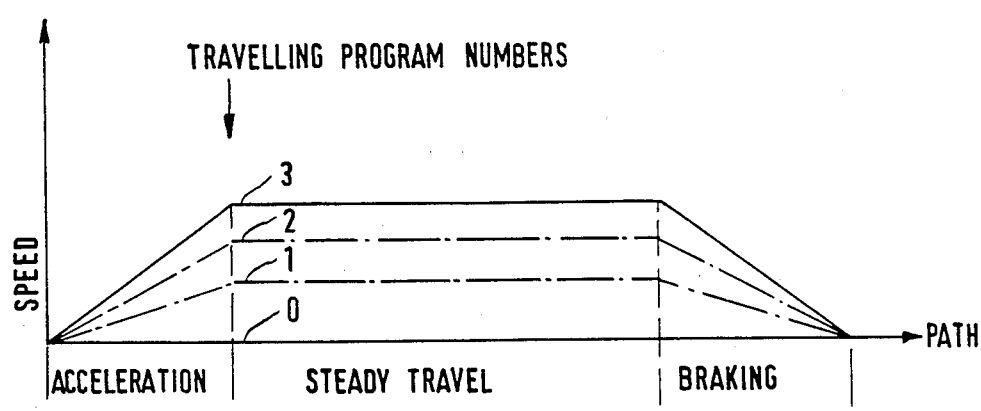

FIG. 3 a cross-section of part of the transporting device of FIG. 1 in an unloading state FIG. 4 a schematic cross-section of a second embodiment of the transporting device FIGS. 5-9 cross-sectional views of several further possibilities of designing the longitudinal structural girders and the positions of the rolling bodies and the travelling-wave stator FIG. 10 a schematic side view of a third embodiment of the transporting device with load-dependent variation of the air-gap space FIG. 11 a cross-section of part of a fourth embodiment of the transporting device with load-dependent variation of the air-gap space FIG. 12 a schematic top view of a possibility of designing a switch in the transport path FIG. 13 an embodiment of the transporting device with automatic control, shown in the form of an electric block diagram FIG. 14 a schematic view of a travelling profile of the automaticaly controlled trassporting device, which may be influenced by travelling program numbers FIG. 15 a schematic side view of a transporting device with a transporting belt divided up into transporting belt sections FIGS. 1 and 2 show a three-legged support 2 which is anchored on the ground at the bottom on foundation blocks 4 and which carries on the top a crossgirder 6 in the form of an I-section. Along the transport path a plurality of such supports 2 are provided at a mutual distance of 5 to 30 m, depending on the constructional design of the transporting device and the weight of the material to be transported per unit of length of the transport path. Crossgirder 6 extends on both sides of support 2. On the underside of crossgirder 6, in each of its end areas, there is a longitudinal girder 8 in the form of an I-section attached. Longitudinal girders 8 extend from support 2 to support 2 in the stated length.

On the underside of each longitudinal girder 8 there is a travelling-wave stator 10 attached. Travelling-wave stator 10 consists of a bundle of laminations laminated in the longitudinal direction and exhibits on the underside a series of equally spaced grooves extending at right angles to the longitudinal direction of the transport path and not shown in the drawing. A travelling-wave winding, which is three-phase, for example, is inserted in a meandering shape into these grooves.

FIGS. 1 and 2 also show moving elements in the form of trolleys 12. Eight rolling bodies in the form of wheels 14 are pivoted to each of the trolleys in such a way that four wheels are located below the lower flange of longitudinal girder 8 and four wheels above the lower flange of longitudinal girder 8, the arrangement being symmetrical to the vertical flange of longitudinal girder 8 and when regarded from the side of trolley 12. Upper wheels 14 may run on the upper side of the lower flange of longitudinal girder 8, and lower wheels 14 may run on the underside of the lower flange of longitudinal girder 8. The gap between the periphery of lower wheels 14 and the periphery of upper wheels 14 is somewhat larger than the thickness of the lower flange of longitudinal girder 8. The upper and/or lower wheels 14 are provided with wheel flanges for lateral guidance.

Each trolley 12 is provided with a series of permanent magnets 16 extending in the direction of transport, in such a way that the series of permanent magnets is located opposite travelling-wave stator 10 below it at an air-gap space a. Permanent magnets 16 have polarity alternating in the longitudinal direction of the transport path, and a spacing corresponding to the three-fold spacing of the arrangement of the grooves in travelling-wave stator 10. In this manner a synchronous linear motor is formed by travelling-wave stator 10 and the series of permanent magnets 16. This linear motor provides both propulsive forces and upwardly vertical carrying forces, air-gap space a being maintained by the cooperation of wheels 14 with longitudinal girder 8. If the weight to be carried by trolley 12 is greater than the magnetic carrying force, upper wheels 14 provide the necessary remainder of carrying force. If the weight to be carried by trolley 12 is smaller than the magnetic carrying force, the rolling of lower wheels 14 on longitudinal girder 8 ensures that permanent magnets 16 do not come in physical contact with travelling-wave stator 10.

A carrying element 18 which essentially has the form of a three-quarter circular strap, the "open quarter" of which points obliquely upward away from support 2, is suspended on each trolley 12 so as to pivot around an axis located in the longitudinal direction of the transport path. Trolleys 12 are spaced from each other one to ten m depending on the weight and amount of the material to be transported. A transporting belt 20 made of correspondingly thick, possibly armored rubber, is inserted into the lower, semicircular area of straps 18 and attached to straps 18 on the right and left. Transporting belt 20 extends from strap 18 to strap 18 either along part of the length of the overall transport path or over the entire transport path including both directions.

Single trolleys 12 are conncted with each other by longitudinal bonds in the form of bars 22 hinged to trolleys 12. Below transporting belt 20, single straps 18 are connected with each other by longitudinal bonds to maintain the transporting belt, in the form of bars 24 hinged to the straps, in order to relieve straps 18 of bending forces. Bars 22 and 24 may connect either some of straps 18 with each other, thereby giving rise to separate transporting belt sections, or all straps 18 of the entire transporting device.

For the unloading of transporting belt 20, areas 26 of straps 18 are each pivoted downward, in an unloading area, around an axis located in the longitudinal direction of the transport path (cf. FIG. 3). These areas 26 are each quarters of the strap 18 adjacent to the free end of the strap 18. When the area 26 is swung downward, the longitudinal edge of transporting belt 20 attached thereto is taken along downward, so that transporting belt 20 essentially assumes the shape, during unloading, of a surface slanted towards the outside and downward. The material G being transported consequently slides, in the unloading area, towards the outside and downward out of the transporting device, whereby unloading may be supported additionally by mechanical strippers and/or cleaning may be carried out by spraying of water, for example. Each area is locked with the rest of strap 18, which has the form of an upright semicircle, by a catch 28 in the upwardly swung state. In each unloading area, a contacting face 30 is provided which raises the catches 28 as they run across it, thereby releasing the lock and swinging down the area 26 under the effect of gravity and/or the weight of the material G being transported. After the unloading process, the area 26 is raised by a further stop face (not shown) or spring power, etc., which acts upon it to make it resume its normal latched position.

In FIG. 1 longitudinal girders 8 attached to the left-hand ends of crossgirders 6 constitute the forward direction of transporting belt 20 for the transport path which must usually be travelled in a loaded state, while the longitudinal girders attached to the right-hand ends of crossgirders 6 constitute the return path of transporting belt 20, usually travelled in an unloaded state. The underside of travelling-wave stator 10 may be provided higher on the return path as on the forward path, thereby creating a larger air-gap space a, in order to do justice to the fact that less carrying force of the linear motor is required there. This possibility is not shown in FIGS. 1 to 3. The forward and return paths are of course connected with each other by corresponding bends at the ends of the transport paths.

One may also design the areas 26 of straps 18 in such a way that they are not rigidly locked to the rest of strap 18 in a normal state, but can pivot more towards the inside. In the way transporting belt 20 may assume, in curves of the transport path, a form which is more compressed at the top than a semicircle.

FIG. 4 shows a transporting device without separate carrying elements for transporting belt 20. Here, only the two edges 32 extending in the longitudinal direction of the transport path are attached to trolleys 12, in such a way that trolleys 12 are specially assigned to each longitudinal edge 32. Longitudinal girders 8 and trolleys 12 have a position pointing obliquely downward and inward, thereby creating a cross-sectional form of transporting belt 20 which is open towards the top, concave and approximately parabolic, and a continuation of this form in the orientation of longitudinal girders 8, which essentially relieves trolleys 12 of lateral forces. As in the embodiment of FIGS. 1 to 3, trolleys 12 may be connected with each other by longitudinal bonds, but this is not necessary.

In the embodiment as in FIG. 5, longitudinal girder 8 has an I-section with a center flange 34 welded on approximately in the center and pointing towards the outside. Travelling-wave stator 10 is attached to the bottom of center flange 34. Flangeless wheels 14 with horizontal axles are located in the space between the upper flange and center flange 34 of longitudinal girder 8 and may thus abut both at the top and at the bottom. Lateral guidance is taken care of by lateral guiding wheels 14', which run on vertical flange 36 of longitudinal girder 8.

The embodiment as in FIG. 6 differs from the embodiment as in FIG. 5 in that vertical flange 36 of longitudinal girder 8 is prolonged toward the top, and the lower flange of longitudinal girder 8 has at one end an extension 38 pointing upward. Pairs of lateral guiding wheels 14 cooperate with the prolonged portion of vertical flange 36 and extension 38.

In the embodiment as in FIG. 7, the upper horizontal flange of longitudinal girder 8 is prolonged on one side by a welded-on plate 40. Plate 40 bears on its underside travelling-wave stator 10. Upper wheels 14 may roll on the upper side of the upper horizontal flange and on the upper side of plate 40, while lower wheels 14 may roll on the underside of the upper horizontal flange and on the underside of plate 40. Lateral guidance is taken care of by lateral guiding wheels or wheel flanges on at least some of wheels 14 (these means are not shown).

In the embodiment as in FIG. 8, two longitudinal girders 8 with an I-section are provided instead of one longitudinal girder 8, which are connected with each other via spaced, U-shaped cross connectors 19 located on the bottom. A travelling-wave stator 10 is attached underneath each longitudinal girder 8. Wheels 14 (not shown) with horizontal axles and possibly additional lateral guiding wheels 14' roll in the spaces pointing toward the inside, which have the form of a horizontal U, of longitudinal girders 8. Trolley 12 formed in this way carries at the top a carrying element 18 which in turn carries a means for taking up material to be transported.

In the embodiment as in FIG. 9, longitudinal girder 8 has an I-section, with spaced crossgirders 11 attached to its upper flange, a longitudinally extending angle section being provided in each of their protruding ends on the left and the right, the open side of the angle section pointing toward the outside and downward. Wheels 14 run on the top and bottom of the horizontal legs of the angle sections, while lateral guiding wheels run on the vertical legs from the outside on both sides of the device. Two travelling-wave stators 10 are attached on the right and left below the protruding ends of crossgirders 11. The entire arrangement is symmetrical to a vertical center plane, the wheels and permanent magnets 16 of the left side being connected with the wheels and permanent magnets 16 of the right side by a strap 17 which essentially has the shape of a U open towards the bottom and reaching across longitudinal girder 8, and carries on its upper side a concave carrying element 18 which is open toward the top. The transporting belt (not shown) is inserted into carrying elements 18 of a series of the spaced trolleys 12 described.

In all embodiments wheels 14 and/or lateral guiding wheels 14' are made of syntheticmmaterial, which requires little servicing and can be carried out due to the relatively low stress on the wheels.

In the embodiments as in FIGS. 5 to 9, the transporting belt may be arranged either suspended on trolleys 12 or standing thereon. It is preferably ensured that—regarded in cross-section—the center of gravity of the loaded transporting belt in the vertical direction is essentially above or below the linear motor or wheels 14 acting in the vertical direction, in order to have to take up overturning moments around an axis located in the longitudinal direction of the transport path which are as little as possible. When the transporting belt is in a suspended arrangement, a hinged suspension around an axis located in the longitudinal direction of the transport path is advantageous in this connection.

It is obvious that in all embodiments as in FIGS. 4 to 9 trolleys 12 exhibit a series of permanent magnets 16 in a position opposite travelling-wave stator 10.

FIGS. 10 and 11 show two possibilities for mechanically adapting air-gap space a to the loaded state of transporting belt 20. In the embodiment as in FIG. 10, lower wheels 14 are not attached rigidly to trolley 12. Instead, a pivoted lever 42 leads toward the back from the front end of trolley 12, and a pivoted lever 42 towards the front from the back end of trolley 12. The two levers 42 are connected with each other at their free ends. A tension spiral spring 46 is arranged between this connecting area 44 and the trolley body. A pair of wheels 14 is pivoted to each of levers 42, each closer to the hinging point of lever 42 than to connecting point 44. Transporting belt 20 is suspended at connecting point 44 by means of a carrying element (not shown). When transporting belt 20 is now loaded with material G, spring 46 is stretched. This pulls the deccribed wheels 14 downward relative to the rest of trolley 12. Since wheels 14 run on suitable areas of longitudinal girders 8 from below, this results in a movement of the trolley upward relative to longitudinal girder 8, and thus a reduction of air-gap space a. Consequently, the linear motor provides a greater magnetic carrying force in a vertical direction.

The embodiment as in FIG. 10 essentially corresponds to the embodiment as in FIG. 6 as far as the design of longitudinal girder 8 and the geometry of the arrangement of the linear motor and wheels 14 and wheels 14' are concerned. At the top on the trolley, an approximately semicircular carrying element 18 open toward the top is provided through the intermediary of tension spiral springs 46. The transporting belt (not shown) is located in carrying element 18. Wheel 14 acting in a vertical direction is mounted on trolley 12 so as to be displaceable vertically relative to the latter. A lever 42' extending essentially horizontally is hinged to trolley 12. The free end of lever 42' which extends at right angles to the longitudinal direction of the transport path, is hinged to carrying element 18. A connecting rod 48, hinged closer to the hinging point to trolley 12 than to the hinging point to carrying element 18, extends from lever 42' essentially vertically to the axis of wheel 14 which is displaceable vertically relative to trolley 12. When the transporting belt is now loaded with material G to be transported, springs 46 are compressed. Consequently, lever 42' is lowered pivoting around the hinging point to trolley 12. This also lowers connecting rod 48 and moves wheel 14 downward relative to trolley 12. This results in a raising of trolley 12 with the rigidly attached series of permanent magnets, relative to longitudinal girder 8. This results in a reduction of air-space gap a and an intended increase in the carrying force provided by the linear motor.

It should be added that the distance between the two longitudinal girders 8 and at the same time, appropriately, their angular orientation along the transport path can be made to be different in the embodiment as in FIG. 4. Thus, it is possible to design the distance between the two longitudinal girders 8 and their angular orientation in an unloading area in such a way that transporting belt 20 is stretched with an essentially horizontal cross-section or with only a slight sag, thereby allowing for particularly comfortable unloading, for example by deflecting the transporting belt by approximately 180°, analogously to conventional conveyor belt devices. The virtually horizontal or only slightly sagging form of transporting belt 20 in cross-section may also be supported by rollers, etc., mainly in the center of the transporting belt. It is also possible to return transporting belt 20 in the tightened form described to the starting point of the transport path, whereby room is saved vertically and the return of transporting belt 20 can be provided in the embodiment as in FIG. 4, for example, above or below the forward path so as to save room. It holds in general that the return of transporting belt 20 may take place not only beside, but also above or below, the forward path.

In the embodiments as in FIGS. 5 to 7, the arrangement shown consisting of longitudinal girder 8, trolley 12 with wheels 14 and 14', travelling-wave stator 10 and a series of permanent magnets 16 may be provided either once, regarded in cross-section, or twice, symmetrically added to. In the former case, the connection to the suspended or standing transporting belt goes upward or downward beside the one longitudinal girder 8, regarded in cross-section. In the second case, the connection to the suspended or standing transporting belt usually goes upward or downward between the two longitudinal girders 8. When longitudinal girders 8 are arranged in a pair, the left-hand and right-hand trolleys 12 are either connected with each other cross-wise mechanically, or not. The embodiment as in FIG. 5 is particularly suitable for an arrangemett of longitudinal girders 8 in a pair.

Preferably, not the entire transport path (forward and return directions) is provided with a continuous, uninterrupted travelling-wave stator 10, but a plurality of travelling-wave stator sections are provided distributed over the longitudinal direction. The travelling-wave stator sections are preferably essentially shorter than the transporiing belt sections, when the entire transporting belt is divided up into separate transporting belt sections. Controlled linear motor units supplied by a current supply unit provided along the path, these linear motor units being shorter than transporting belt sections, are to be termed "linear motor elements". Such an element is preferably controlled in such a way that a transporting belt section coming into the area of the particular motor element, detected by one or more stationary sensors provided on the linear motor section, switches on or off the particular motor element and synchronizes it with the permanent magnet pole speed of the transporting belt section. Due to the division into linear motor elements, only relatively little power, installed or to be applied, is necessary in each motor element, which power occurs in the form of frequency converters with control, current supply, etc., which may be produced in large numbers and are therefore not too expensive. Several transport speeds which can be called in either centrally or by the influence of transporting belt sections may be stored in the control of each motor element. In this manner, the possibility described above of different speeds and different distances between the transporting belt sections may be realized relatively simply. It is possible in particular to have the transporting belt sections go more quickly in certain areas, for example along a free stretch of the transport path without narrow curves, and more slowly in certain other areas, for example in loading areas, unloading areas, stretches of the transport path with narrow curves. The motor elements are preferably shorter than the transporting belt sections, for example a few m long in comparison with a transporting belt section length of several 100 m.

FIG. 12 schematically shows a switch construction for the case of longitudinal girders 8 with an I-section. Both the upper flange and the lower flange of longitudinal girder 8 are provided on the side with transverse recesses which may be sawed in, for example. This provides longitudinal girder 8 with enough elasticity in the transverse direction to allow it to be bent, if it is long enough, elastically at one end around the necessary stretch in the transverse direction in order to be connected to a branching longitudinal girder.

FIG. 13 shows, in the form of an electric block diagram, an embodiment of the transporting device with automatic control. Travelling-wave stator ST is divided up into a plurality of stator sections ST, only three of which, ST5, ST6 and ST7, are completely shown in FIG. 13. Each of these stator sections has an energy supply unit E5, E6 and E7, respectively, assigned to it, to which a switching device belongs by means of which the power made available by the particular energy supply unit can be connected to the assigned stator section. Along stator ST, sensors S are arranged, which react to signal transmitters SG1 and SG2 on linear motor armature L. In the embodiment shown in FIG. 13, each stator section has two sensors S51, S52 and S61, S62 and S71, S72, respectively, assigned to it, one of which is located in the front end area of the particular stator section and the other of which is located in the back end area thereof. When, for example, with the relative positions of linear motor armature L and linear motor stator ST as shown in FIG. 13, the signal transmitter SG1, which is located at the front in the direction of travel, comes into the sensor area of sensor S51, this causes the travelling power made available by energy supply unit E6 to be connected to stator section ST6. When the signal transmitter SG2 of linear motor armature L, which is located at the back in the direction of travel, then comes into the sensor area of sensor S62, energy supply unit E5 is switched off from stator section ST5.

Either the permanent magnets themselves which are preferably used for the linear motor armature, or signal transmitter magnets additionally arranged on linear motor armature L may be used as signal transmitters SG1 and SG2. Hall sensors are preferably used for sensors S along stator ST.

To obtain the desired travelling profile as shown in FIG. 14, the single energy supply units may be designed for maximum performance corresponding to the local need for power corresponding to the travelling profile. Or one may instead solely use energy supply units which are identical with respect to the maximum power provided, making the stator sections supplied by the various energy supply units vary in length depending on the local power requirement.

The travelling profile may be made variable in a technically fairly simple manner by using a travelling program number control. For this purpose, each energy supply unit in the embodiment shown in FIG. 13 has a memory assigned to it in which a number of different travelling speed control signals corresponding to the number of predetermined triggerable travelling programs may be stored. The memories are connected via a common bus line BL with a control point C, from which the memories in the various energy supply units are given the travelling program numbers corresponding to the particular travelling profile desired. Each energy supply unit may then give the assigned stator section a local travelling power corresponding to the particular travelling program number selected. The travelling power corresponding to a certain travelling program number may vary for different stator sections. In this manner, it is sufficient to give only one travelling program number to bus line BL from control point C in each case, to which the locally specified individual travelling power for the particular travelling profile selected is then assigned in the various energy supply units. Control point C may be assigned to all stator sections of the transporting device or only to some of the stator sections, in which case further groups of stator sections are each controlled by a further control point.

In the example of a travelling profile shown in FIG. 14, an acceleration stretch is followed by a steady travel stretch, and travel is ended after a braking stretch. By means of four travelling program numbers, four speed profiles 0 (standstill) to 3 (maximum speed) may be selected. In practice, travelling profiles will be required which are of a different kind and more complicated. For example, intermediate acceleration and intermediate braking will be required for uphill and downhill travel or around curves, and in the case of an inventive transporting device of the conveyor belt type, only reduced speeds other than 0 will occur in the loading and unloading zones, except when travelling program 0 is selected.

FIG. 15 shows the possibility of dividing the transporting belt up into several transporting belt sections 20', which travel along the transport path, spaced from each other, in the direction of travel. The construction is altogether analogous to the transporting device shown in more detail in FIG. 2.

I claim:

1. In a transporting device for transporting material along a transport path, comprising individual transporting belt sections for accommodating the material to be transported, a plurality of trolleys equipped with wheels and movable along the transport path for carrying the transporting belt sections, said trolleys being spaced in the longitudinal direction of the transport path and provided for each transporting belt section, and electric driving means for driving the trolleys along the transport path, the improvement comprising:

belt support means suspended from the individual trolleys and including upwardly concave belt support portions for supporting the respective transporting belt sections;

connecting bars provided between the belt support portions of the belt support means extending in the longitudinal direction of the respective transporting belt section underlying the belt sections along the transport path, said connecting bars being effective for limiting belt sag between adjacent of said belt support means; and said electrical driving means is operative as a synchronous linear motor comprising a traveling wave stator arranged at the transport path and attracting permanent magnets arranged in series on the trolleys below and opposite the traveling-wave stator with an air-gap between the traveling-wave stator and the pole faces of the attracting permanent magnets, the attracting permanent magnets being held at said air-gap space from the traveling-wave stator by means of the trolley wheels being relieved in response to the attracting magnetic forces between the permanent magnets and the traveling-wave stator, from at least a substantial part of the carrying forces arising in the weight of the respective transporting belt section and the material to be transported.

2. In the transporting device as in claim 1 including second connecting bars provided between each of the trolleys associated with a transporting belt section.

3. In the transporting device as in claim 1 in which each of the belt support portions of said support means may be pivoted at least partially for unloading of the respective transporting belt section.

4. In the transporting device as in claim 3 including a contacting face provided in an unloading area of the transport path for pivoting said support means.

5. In the transporting device as in claim 3 including a catch provided between the pivotable part and the reaminder of the support means, and a contacting face is provided in an unloading area of the transport path for opening said catch.

6. In the transporting device as in claim 1 in which said traveling-wave stator is divided into stator sections, and that the movement of the respective transporting belt sections is controlled according to an automatic control principle, by which the linear motor armature switches the stator sections.

7. In the transporting device as in claim 1 in which said traveling-wave stator is divided into stator sections, and that the stator sections are controllably energized for said transporting belt sections to be driven slower in loading or unloading areas than in the portions of the transport path therebetween.

8. In the transporting device as in claim 6 in which said stator sections are controllably energized for said transporting belt sections to be driven slower in loading or unloading areas than in the portions of the transport path therebetween.

* * * * *

UNITED STATES PATENT AND TRADEMARK OFFICE
CERTIFICATE OF CORRECTION

PATENT NO. : 4,792,036

DATED : December 20, 1988

INVENTOR(S) : Gotz Heidelberg

It is certified that error appears in the above-identified patent and that said Letters Patent is hereby corrected as shown below:

Column 2, line 33, "transoorting" should be --transporting--.

Column 3, line 12, "th" should be --the--.

Column 4, line 28, "mooor" should be --motor--.

Column 7, line 26, "conncted" should be --connected--.

Column 9, line 25, "syntheticmmaterial" should be --synthetic material--.

Column 11, line 7, "transporiing" should be --transporting--.

Signed and Sealed this

Eighth Day of August, 1989

Attest:

DONALD J. QUIGG

*Attesting Officer*      Commissioner of Patents and Trademarks